(12) United States Patent
Kerr et al.

(10) Patent No.: US 7,139,899 B2
(45) Date of Patent: Nov. 21, 2006

(54) SELECTED REGISTER DECODE VALUES FOR PIPELINE STAGE REGISTER ADDRESSING

(75) Inventors: Darren Kerr, Palo Alto, CA (US); John William Marshall, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/390,079

(22) Filed: Sep. 3, 1999

(65) Prior Publication Data

US 2003/0159021 A1    Aug. 21, 2003

(51) Int. Cl.
G06F 9/34    (2006.01)
(52) U.S. Cl. .................................... 712/218
(58) Field of Classification Search ................ 712/218, 712/219
See application file for complete search history.

(56) References Cited

U.S. PATENT DOCUMENTS

| | | | | |
|---|---|---|---|---|
| 4,594,655 A | * | 6/1986 | Hao et al. .................... | 712/218 |
| 4,644,466 A | * | 2/1987 | Saito ........................... | 712/218 |
| 5,161,156 A | | 11/1992 | Baum et al. | |
| 5,165,034 A | * | 11/1992 | Kanuma ....................... | 712/218 |
| 5,166,674 A | | 11/1992 | Baum et al. | |
| 5,276,822 A | * | 1/1994 | Maekawa et al. ............ | 712/218 |
| 5,467,476 A | * | 11/1995 | Kawasaki ..................... | 712/218 |
| 5,638,526 A | * | 6/1997 | Nakada ........................ | 712/218 |
| 5,790,880 A | * | 8/1998 | Ireton .......................... | 712/218 |
| 6,073,233 A | | 6/2000 | Chapman | |
| 6,101,599 A | | 8/2000 | Wright et al. | |
| 6,119,215 A | | 9/2000 | Key et al. | |
| 6,145,074 A | * | 11/2000 | Asato .......................... | 712/218 |
| 6,173,386 B1 | | 1/2001 | Key et al. | |
| 6,195,739 B1 | | 2/2001 | Wright et al. | |

* cited by examiner

Primary Examiner—Richard L. Ellis
(74) Attorney, Agent, or Firm—Cesari and McKenna LLP

(57) ABSTRACT

An instruction decode mechanism enables an instruction to control data flow bypassing hardware within a pipelined processor of a programmable processing engine. The control mechanism is defined by an instruction set of the processor as a unique register decode value that specifies either source operand bypassing (via a source bypass operand) or result bypassing (via a result bypass operand) from a previous instruction executing in pipeline stages of the processor. The source bypass operand allows source operand data to be shared among the parallel execution units of the pipelined processor, whereas the result bypass operand explicitly controls data flow within a pipeline of the processor through the use of result bypassing hardware of the processor. The instruction decode control mechanism essentially allows an instruction to directly identify a pipeline stage register for use as its source operand.

52 Claims, 5 Drawing Sheets

SELECTED REGISTER DECODE VALUES FOR PIPELINE STAGE REGISTER ADDRESSING

FIELD OF THE INVENTION

The present invention relates to processor architectures and, in particular, to an improved operand bypassing technique for a pipelined processing engine of an intermediate network device.

BACKGROUND OF THE INVENTION

Computer architecture generally defines the functional operation, including the flow of information and control, among individual hardware units of a computer. One such hardware unit is the processor or processing engine which contains arithmetic and logic processing circuits organized as a set of data paths. In some implementations, the data path circuits may be configured as a processor having a register file of general-purpose registers (GPRs) for use with operations that are defined by a set of instructions. The instructions are typically stored in an instruction memory and specify a set of hardware functions that are available on the processor. When implementing these functions, the processor generally processes "transient" data residing in a memory in accordance with the instructions.

A high-performance processing engine configured for use in, e.g., an intermediate network device may be realized by using a number of identical processors to perform certain tasks in parallel. In order to increase instruction throughput, the processors of the high performance engine may employ a technique called pipelining. A pipelined processor has a pipeline containing a number of processing stages, such as an instruction fetch (IF) stage, an instruction decode (ID) stage, an execution (EX) stage and a writeback (WB) stage. These stages are generally arranged so that a new instruction is stored in an input register of each stage as the result calculated in that stage is stored in an input register of a subsequent stage. Accordingly, there may be a number of instructions active in the processor pipeline at any one time.

For example, consider the following instruction sequence utilizing various GPRs of the processor:

(i1) add R3←R1, R2
(i2) add R5←R3, R4

Execution of instruction i1 results in register R3 storing the contents of R1+R2, while execution of instruction i2 results in R5 storing the contents of R3+R4. Assume i1 enters the pipeline at the IF stage in cycle 1 and proceeds to the ID stage at cycle 2 as i2 enters the pipeline at the IF stage. During the ID stage, operand values are fetched from the register file of the processor. That is during the ID stage of i1, the values of the registers R1 and R2 are fetched from the register file and are loaded into input registers of the EX stage at the end of the IF stage cycle.

In cycle 3, i2 reaches the ID stage and expects to load its operands from registers R3 and R4. However, i1 has only reached the EX stage and will not complete the WB stage until the end of cycle 4. Accordingly, the correct operand for i2 will not be loaded into register R3 until cycle 4 has completed. This is an example of data dependency between instructions executing in parallel in the pipeline. Here, the data dependency exists between the destination operand of i1 and the source operand of i2; in other words, i2 depends on a result produced by the preceding instruction i1 and cannot proceed until that result (stored in R3) is available.

Commercially available pipeline processors employ operand bypassing to improve processing time for sequences of instructions that have data dependencies. Operand bypassing is a technique whereby an operation result may be used without waiting for that result to flow through all of the stages of a pipelined processor. An implementation of operand bypassing involves the use of a conventional control mechanism that employs a GPR operand comparison approach to identify the data dependency during the ID stage. For example the comparison may be used to determine a data dependency between the instructions i1 and i2 for register R3. Once the dependency is identified, the control mechanism provides the result of i1 from the EX stage directly back to an input register of that stage, thereby bypassing the WB stage of the pipeline.

Where the data dependency is based solely on GPR registers, that dependency may be identified through use of a conventional scoreboarding technique that keeps track of the registers used by instructions propagating through the pipeline. The technique utilizes a scoreboard data structure having a plurality of bits associated with the GPRs; these bits are asserted when instructions utilizing the registers are dispatched into the pipeline. For example, the scoreboard technique marks register R3 as "not available" and the control mechanism suspends execution of i2 until R3 is available. Here, the conventional control mechanism "implicitly" specifies bypass conditions through instruction decode.

However, a problem arises with a processor architecture that also enables operands to address data from memory via a memory bus. Application of the conventional scoreboarding technique to memory addresses is rather cumbersome because of the additional "overhead" (logic) needed to realize the dependency function across an entire memory address space (e.g., a 32-bit address space). The present invention is directed to a technique that solves this problem. Specifically, the invention is directed to a pipeline stage addressing technique that obviates the need for a scoreboard data structure in the processor. More specifically, the present invention is directed to a technique for explicitly specifying bypass conditions in a manner that is efficient from a logic implementation and that reduces penalties from a microcode perspective.

SUMMARY OF THE INVENTION

The present invention relates to a mechanism that enables an instruction to control data flow bypassing hardware within a pipelined processor of a programmable processing engine. The control mechanism is defined by an instruction set of the processor as a unique register decode value that specifies either source operand bypassing or result bypassing from a previous instruction executing in pipeline stages of the processor. The novel instruction decode control mechanism essentially allows an instruction to directly identify a pipeline stage register (i.e., via pipeline stage register addressing) for use as its source operand.

In one aspect of the present invention, the register decode value comprises a result bypass (RRB) operand that explicitly controls data flow within a pipeline of the processor through the use of result bypassing hardware of the processor. The pipeline generally includes instruction decode, writeback and execution stages, the latter stage having a plurality of parallel execution units. Result bypassing allows data to be retrieved from a current execution unit and returned to an input execution register specified by the RRB operand, thereby bypassing "writeback" of the data to either a register file or memory at the writeback stage of the processor. By explicitly specifying the pipeline stage register to be used as the source operand for the current instruction, the invention obviates the need to keep track of a large scoreboard addressing area and, thus, eliminates the need for a scoreboard data structure in the processor.

In another aspect of the invention, the register decode value comprises a source bypass (RISB) operand that allows source operand data to be shared among the parallel execution units of the pipelined processor. For example, source bypassing allows a secondary execution unit to receive data stored at an effective memory address specified by a displacement operand in a previous instruction executed by a main execution unit of the processor. This aspect of the invention improves performance of the processor, particularly for data received over a local bus from a memory of the processing engine. That is, source bypassing effectively allows realization of two memory references through the use of a single bus operation over the local bus. In addition, the novel RISB decode value represents coding efficiencies since the operand may be encoded with substantially fewer bits than those needed for a displacement address.

Advantageously, the novel control mechanism increases performance of a pipelined processor by enabling bypass operations without the use of dedicated hardware to identify and resolve operand dependencies. The inventive control mechanism further allows greater coding efficiency since memory operand results can be bypassed via a special register reference as opposed to specifying a memory operand. Moreover, pipeline stage register addressing provides an efficient means to specify the use of a previous instruction result as a source operand for the instruction.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
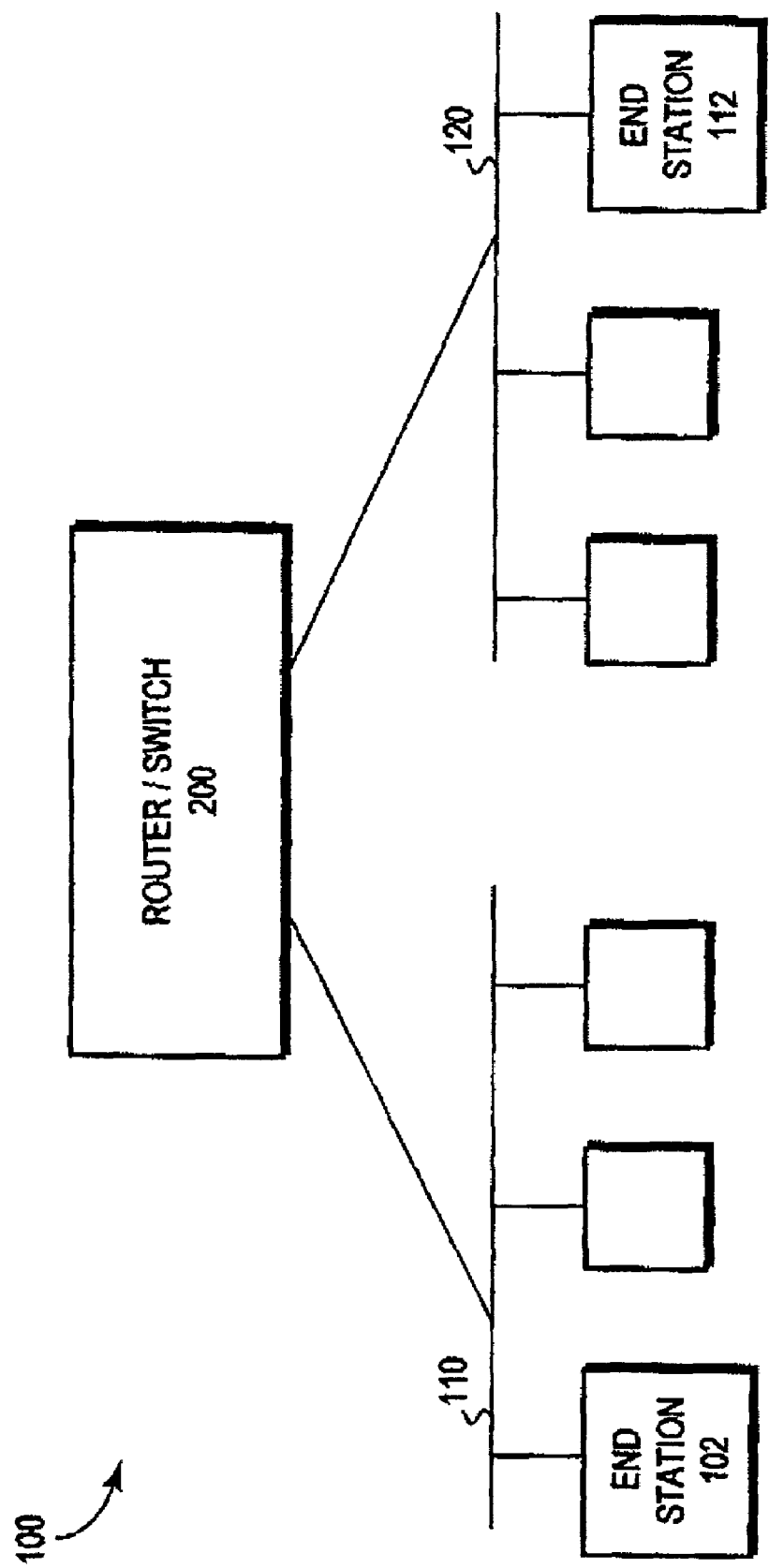
FIG. 1 is a block diagram of a computer network comprising a collection of interconnected communication media and subnetworks attached to a plurality of stations.

FIG. 1 is a block diagram of a computer network 100 comprising a collection of interconnected communication media and subnetworks attached to a plurality of stations. The stations are typically computers comprising end stations 102, 112 and intermediate station 200. The intermediate station 200 may be a router or a network switch, whereas the end stations 102, 112 may include personal computers or workstations. The subnetworks generally comprise local area networks (LANs) 110 and 120, although the invention may work advantageously with other communication media configurations such as point-to-point network links. Communication among the stations of the network is typically effected by exchanging discrete data frames or packets between the communicating nodes according to a predefined protocol. For the illustrative embodiment described herein, the predefined protocol is the Internet protocol (IP), although the invention could be implemented with other protocols, such as the Internet Packet Exchange protocol, AppleTalk protocol or DECNet protocol.

Figure 2:
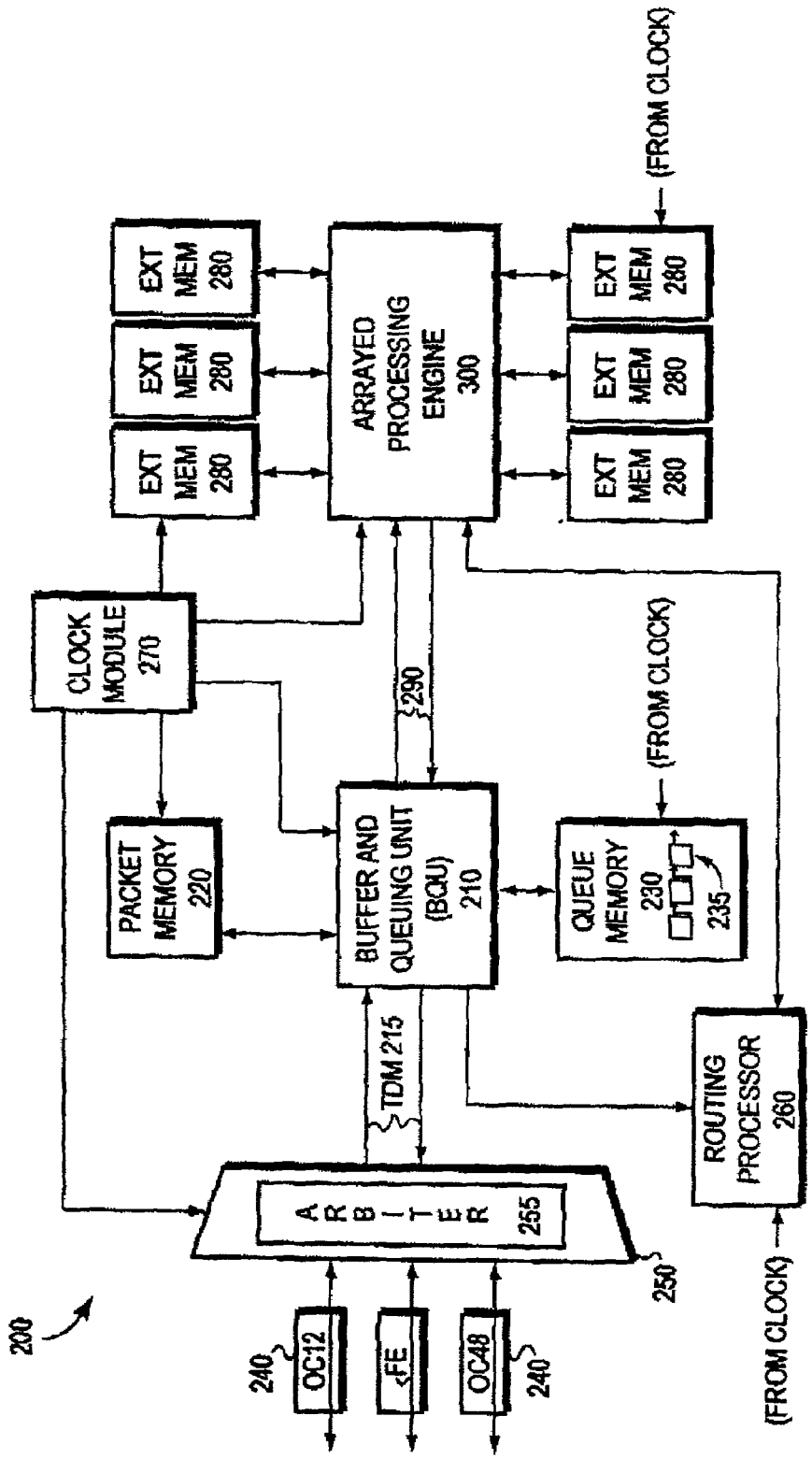
FIG. 2 is a schematic block diagram of intermediate station, such as a network switch, that may be advantageously used with the present invention.

FIG. 2 is a schematic block diagram of intermediate station 200 that, in the illustrative embodiment, is preferably a network switch. The switch generally performs layer 2 processing functions, such as "cut-through" operations wherein an entire frame does not have to be stored before transfer to a destination; in addition, switch 200 may implement layer 3 forwarding operations. It should be noted, however, that the intermediate station may also be configured as a router to perform layer 3 route processing. A feature of the inventive architecture described herein is the ability to program the station for execution of either layer 2 and layer 3 operations. To that end, operation of the switch will be described with respect to IP switching of packets, although the switch may be programmed for other applications, such as data encryption.

The switch 200 comprises a plurality of interconnected components including an arrayed processing engine 300, various memories, queueing logic 210 and network port interface cards 240. Operations of these components are preferably synchronously controlled by a clock module 270 although the arrayed elements of the processing engine may be operatively configured to function asynchronously. In the illustrative embodiment, the clock module 270 generates clock signals at a frequency of 200 megahertz (i.e., 5 nanosecond clock cycles) and globally distributes them via clock lines to the components of the switch.

The memories generally comprise random access memory (RAM) storage locations addressable by the processing engine and logic for storing software programs and data structures accessed by the components. An operating system, portions of which are typically resident in memory and executed by the engine, functionally organizes the switch by, inter alia, invoking network operations in support of software processes executing on the switch. It will be apparent to those skilled in the art that other memory means, including various computer readable media, may be used for storing and executing program instructions pertaining to the operation of the switch.

The arrayed processing engine 300 is coupled to a memory partitioned into a plurality of external memory (Ext Mem) resources 280. A buffer and queuing unit (BQU) 210 is connected to a packet memory 220 for storing packets and a queue memory 230 for storing network layer headers of the packets on data structures, such as linked lists, organized as queues 235. The BQU 210 further comprises data interface circuitry for interconnecting the processing engine with a plurality of line cards 240 via a selector circuit 250 having an arbiter 255. The line cards 240 may comprise, e.g., OC12, OC48 and Fast Ethernet (FE) ports, each of which includes conventional interface circuitry that incorporates the signal, electrical and mechanical characteristics, and interchange circuits, needed to interface with the physical media and protocols running over that media. A typical configuration of the switch may include many input/output channels on these interfaces, each of which is associated with at least one queue 235 in the queue memory 230. The processing engine 300 generally functions as a switching processor that modifies packets and/or headers in sequence as the BQU 210 implements queuing operations.

A routing processor (RP) 260 executes conventional routing protocols for communication directly with the processing engine 300. The routing protocols generally comprise topological information exchanges between intermediate stations to determine optimal paths through the network based on, e.g., destination IP addresses. These protocols provide information used by the RP 260 to create and maintain routing tables. The tables are loaded into the external partitioned memories 280 as forwarding information base (FIB) tables used by the processing engine to perform forwarding operations. When processing a header in accordance with IP switching, the engine 300 determines where to send the packet by indexing into the FIB using an IP address of the header. Execution of the forwarding operations results in destination media access control (MAC) addresses of the headers being rewritten by the processing engine to identify output ports for the packets.

Figure 3:
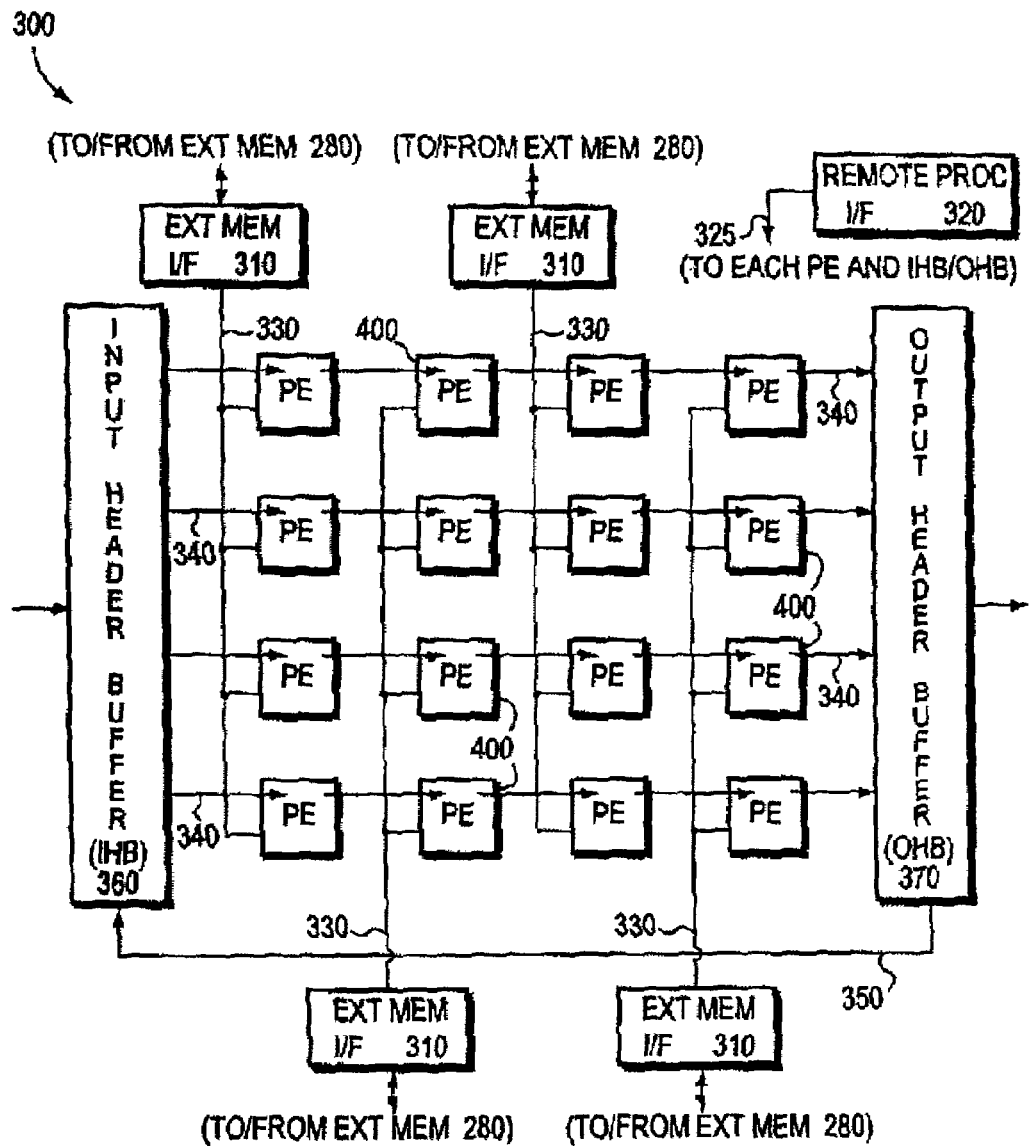
FIG. 3 is a schematic block diagram of a programmable arrayed processing engine having a plurality of processor complex (PE) elements.

FIG. 3 is a schematic block diagram of the programmable processing engine 300 that may be advantageously used with the present invention. The processing engine comprises a plurality of processing elements (PE) 400 arrayed into multiple rows and columns; in the illustrative embodiment, the PEs are arrayed as four (4) rows and four (4) columns in a 4×4 arrayed configuration that is embedded between an input header buffer (IHB) 360 and an output header buffer (OHB) 370. Note that other configurations, such as a 6×6 arrayed configuration, may be used in advantageously used with the present invention.

A 64-bit feedback path 350 couples the OHB 370 to the IHB 360 and provides a data path for recycling data through the PE stages of the processing engine. The PEs of each row are configured as stages connected in series by a 100 MHz 64-bit direct memory access (DMA) data path 340 that synchronously transfers data and control "context" from one PE to the next. Specifically, the processing elements of each row are configured as stages of a pipeline that sequentially execute operations on the transient data loaded by the IHB 360, whereas the processing elements of each column operate in parallel to perform substantially the same operation on the transient data, but with a shifted phase. An example of an arrayed processing engine and network switch suitable for use with the present invention is described in copending and commonly-owned U.S. patent application Ser. No. 09/106,478 titled Programmable Arrayed Processing Engine Architecture for a Network Switch, which application is hereby incorporated by reference as though fully set forth herein.

Figure 4:
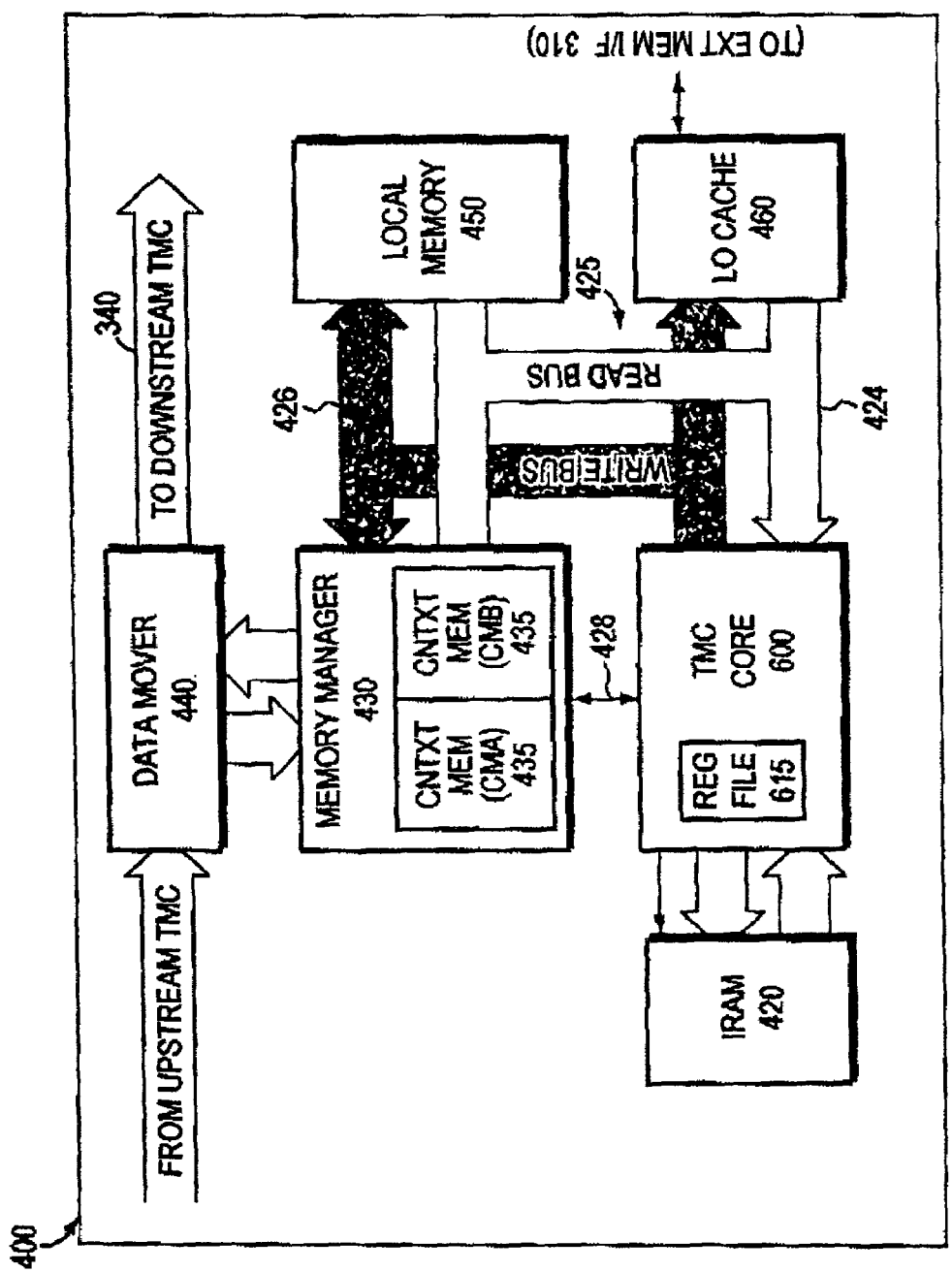
FIG. 4 is a schematic block diagram of a PE element comprising a microcontroller processor (TMC) core for use with the present invention.

FIG. 4 is a schematic block diagram of a PE 400. The PE is a processor complex comprising a processor 600 coupled to an instruction memory (IRAM) 420 and a memory manager (MM) circuit 430. The IRAM 420 stores instructions for execution by the processor 600, which is preferably a customized microcontroller (TMC) core having a dense structure which enables implementation of similar cores on an application specific integrated circuit. It will be apparent to those skilled in the art, however, that other processor cores may be advantageously used with the processor complex architecture described herein.

The TMC core 600 is preferably a pipelined processor that includes a plurality of arithmetic logic units (ALUs), a register file 615 having a plurality of 32-bit general purpose registers (GPRs) and an instruction fetch and decode unit organized as a set of data paths. The GPRs generally store intermediate result information processed by the ALUs, whereas the instruction fetch and decode unit decodes instructions fetched from the IRAM. The intermediate results are passed among PE stages 400 of the engine 300 over a consistent data path channel 340 provided by a data mover circuit 440 coupled to the MM 430. The TMC also supports fast task context switching to enable software pipelining across multiple cores.

A 64-bit local bus 425 (comprising a read bus portion 424 and a write bus portion 426) interconnects the TMC core with context memories 435, a local memory 450 and a level zero (L0) cache 460 coupled to an external memory I/F 310. The local bus 425 can sustain one 64-bit read operation and one 64-bit write operation per cycle for data aligned on a 4-byte boundary. The maximum sustainable rate for non-aligned data accesses is one 32-bit read operation and one 32-bit write operation per clock cycle. The TMC core may directly access locations in the context memories 435 and the local memory 450 using an operand address associated with an instruction. Notably, the context memories 435 and the local memory 450 support zero wait state non-aligned accesses; accordingly, there is generally no performance difference when accessing data in those memories or the internal registers of the TMC core.

Each context memory 435 stores transient "context" data (e.g., packet/frame data) flowing through the PE 400 that is unique to a specific process, whereas the local memory 450 is generally configured to store, inter alia, pointers that reference data structures and tables stored in external memory 280 for use by the TMC core 600. Management of the context sensitive memory is provided by the MM 430, which comprises data path and control logic for cooperating with the data mover 440 and context memories 435 to efficiently pass data among the PE stages of the processing engine. The L0 cache 460 may be a fully associative, multiport data cache that services external memory 280 and a shared column memory (not shown); notably, the L0 cache provides various caching and buffering functions for those memories, and may further issue specific memory primitives to the appropriate memory controller of either the external or internal shared memory to thereby increase the overall bandwidth and efficiency of the TMC 600.

The TMC architecture incorporates a VLIW design capable of executing more than one instruction per cycle through the use of multiple execution units performing multiple scalar operations in parallel. The execution units are a main execution unit (M-unit) and a secondary execution unit (S-unit). As noted, the TMC processor architecture enables operands to address data from, e.g., local memory 450 via the local bus 425; however a difference between the two execution units is that the S-unit does not directly address memory. Parallel operation of execution units increases the processing performance of the switch while also decreasing the number of data transfers over the local bus. For such a design, an instruction decoder determines whether an execution unit is ready for operation. The TMC architecture utilizes a wide instruction that explicitly schedules operation of the execution units.

In the illustrative embodiment, the TMC core 600 uses a 64-bit instruction word to operate on multiple 32-bit data values. Logical operations are performed on indirect memory operands to improve the overall density of the instruction code by merging arithmetic instructions with load/store instructions into one instruction. Broadly stated, multiple opcodes of differing widths can be encoded in a fixed length instruction word. Each instruction word contains two major opcodes and up to three minor opcodes (micro-ops) that execute in parallel. Instruction level parallelism is scheduled by software as opposed to hardware, thereby eliminating the need for hardware-based schedulers while enabling completion of multiple instructions per cycle. An instruction set architecture provides micro-opcodes to initiate memory prefetches without requiring a dedicated instruction.

Figure 5:
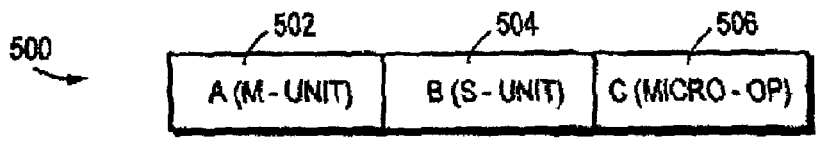
FIG. 5 is a schematic diagram of a TMC instruction that may be advantageously used with the present invention.

Each instruction generally includes two primary opcodes, one of which is directed to the M-Unit (e.g., M add) and the other which is directed to the S-Unit (e.g., S and). As noted, each opcode executes concurrently on its respective unit and in parallel with the other. FIG. 5 is a schematic diagram of a TMC instruction 500 comprising a 32-bit A part 502 containing an opcode directed to the M-Unit, a 22-bit B part 504 containing an opcode issued to the S-Unit (or branch unit), and a 10-bit C part 506 comprising three micro-opcode fields. From an instruction decode perspective, the S-Unit does not have direct access to the local bus 425 primarily because a (displacement) operand requires 12 bits to encode in displacement form and the TMC architecture does not define that quantity of bits for an S-Unit instruction.

Figure 6:
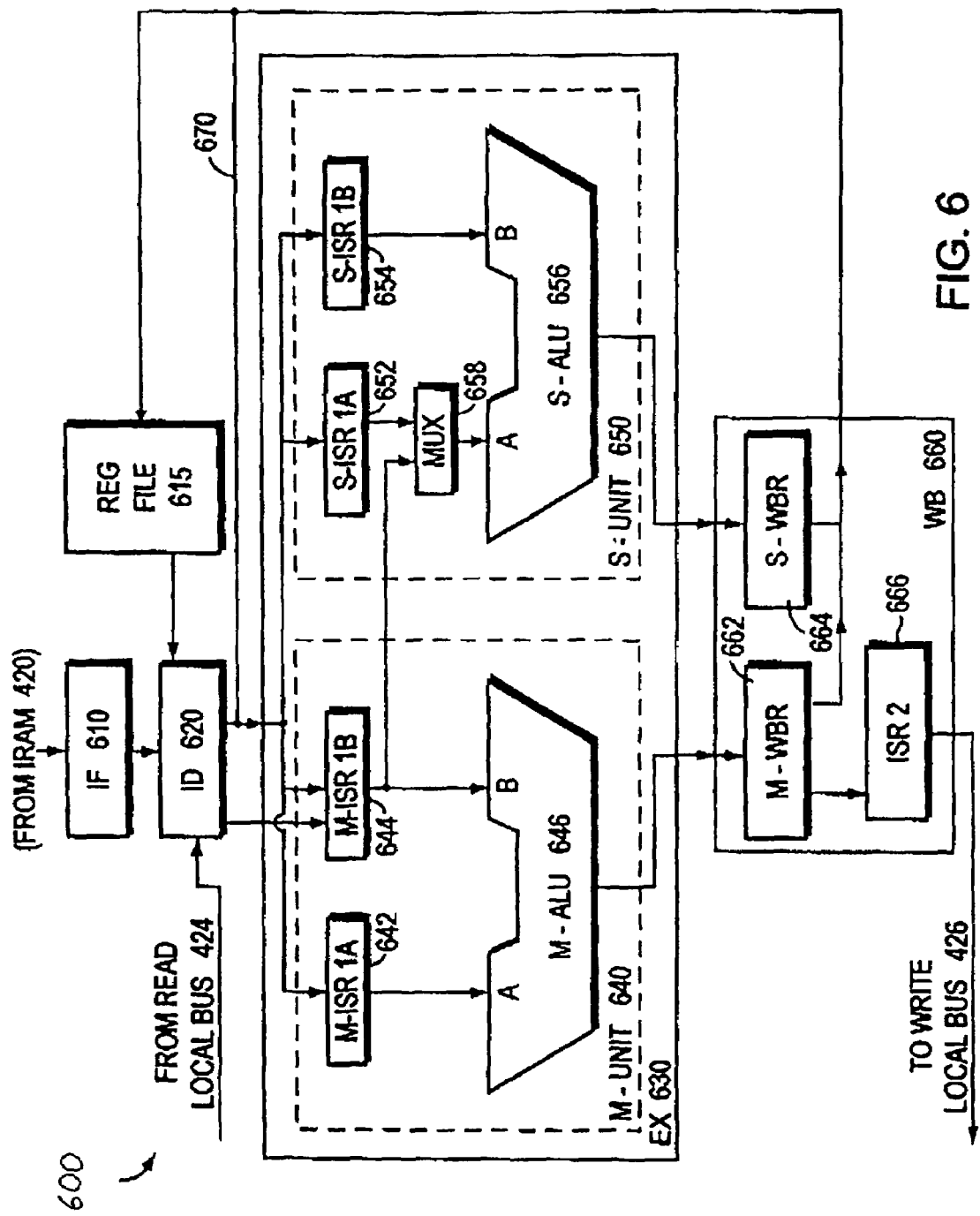
FIG. 6 is a schematic diagram of the TMC core that preferably embodies a multistage pipeline design that may be advantageously used with the present invention.

FIG. 6 is a schematic diagram of the TMC core 600 which preferably embodies a multi-stage pipeline data path organization comprising (i) an instruction fetch (IF) stage 610; (ii) an instruction decode (ID) stage 620; (iii) an execution (EX) stage 630; and (iv) a writeback (WB) stage 660. The EX stage includes a main execution unit (M-unit 640) and a secondary execution unit (S-Unit 650) that are similar with respect to their execution logic. That is, the M-Unit 640 comprises a plurality of interstage registers M-ISR1A 642 and M-ISR1B 644 coupled to inputs of a M-ALU 646; likewise, the S-Unit 650 comprises interstage registers S-ISR1A 652 and S-ISR1B 654 coupled to inputs of a S-ALU 656.

According to the TMC micro-architecture, the M-Unit 640 is configured to communicate directly with memory over the local bus 425, whereas the S-Unit 650 is directed primarily to register-type operations (which can also be performed by the M-Unit). To that end, memory operands may be retrieved from the read local bus 424, stored in M-ISR1B 644 and provided to the B input of the M-ALU 646, while intermediate (e.g., GPR) operands are stored in M-ISR1A 642 and provided to the A input of that logic unit. In contrast, only intermediate operands may be stored in S-ISR1A 652 and S-ISR1B 654, and provided to A and B inputs of S-ALU 656, respectively. Although data received by the TMC core 600 over the read bus 424 is directed solely to the M-Unit 640, the TMC architecture includes a bypass mechanism comprising, in part, multiplexer 658 that allows the S-Unit 650 to share such data with the M-Unit.

The WB stage 660 comprises a plurality of registers, including M-WBR 662 coupled to the output of M-ALU 646 and S-WBR 664 coupled to the output of S-ALU 656. Outputs of these registers are provided to the register file 615. For instructions that specify the register file as the destination of the data, the write-back actually occurs during the EX stage. Another interstage register ISR2 666 is coupled to M-WBR 662 and configured to store data that is destined for the write local bus 426.

Functionally, the IF stage accommodates accesses to the IRAM to acquire instructions. The ID stage fetches information (such as source operands) from memory over the read local bus 424 or from the internal register file 615 for temporary storage in M-ISR1B, whereas source operands fetched from only the register file are stored in M-ISR1A, S-ISR1A and S-ISR1B. The fetched information flows through the EX stage of TMC execution units for processing and then to the WB stage for storage in M-WBR or S-WBR prior to transfer to the register file 615. For information destined to either the L0 cache 460, the context memories 435 or to the local memory 450, ISR2 is employed to store that information prior to transfer over the write local bus 426. Within this context, the invention is directed, in part, to the EX and WB stages.

Broadly stated, the invention is directed to use of operand bypassing to improve processing time for sequences of instructions that have data dependencies. A typical implementation of operand bypassing involves the use of a conventional control mechanism that employs GPR operand comparison and a scoreboard to identify data dependencies during the ID stage. The conventional control mechanism "implicitly" specifies bypass conditions through instruction decode. However, a problem arises with a processor architecture, such as the TMC architecture, that enables operands to address data from memory. Application of conventional scoreboarding techniques to memory addresses requires additional "overhead" (logic) to realize the dependency function across the memory address space. The present invention is directed to a pipeline stage addressing technique that obviates the need for a scoreboard data structure in the processor.

Consider the following instruction with implicit bypassing:

(i3) add 10(R3)←R5, R2
(i4) add R1←R7, 10(R3)

There is a dependency on the displacement memory operand 10(R3). This dependency may be identified using address comparison logic of the conventional control mechanism. In accordance with the present invention, however, the same function may be achieved via a pipeline stage register addressing technique that allows an instruction to directly identify a pipeline stage register for use as its source operand without the need for address comparison logic. The addressing technique is an integral part of a novel control mechanism defined by an instruction set of the TMC processor as a unique register decode value that specifies either source operand bypassing or, as indicated above, result bypassing from a previous instruction executing in pipeline stages of the processor.

In one aspect of the present invention, the register decode value comprises a register result bypass (RRB) operand that explicitly controls data flow within the pipeline of the TMC processor 600 through the use of result bypassing hardware of the processor.

(i3) add 10(R3)←R5, R2
(i4') add R1←R7, RRB

Rather than actually specifying the memory operand 10(R3), the RRB operand explicity infers feedback of data delivered from a current execution unit (e.g., M-unit) back to an input execution register (e.g., M-ISR1A) over feedback path 670, thereby bypassing write-back of the data to either the register file 615 or to ISR2 of the WB stage. In addition to bypassing results of a memory operation operand (e.g., an address) and GPR, the novel RRB operand enables bypassing of results of a transform register (e.g., a register internal to the TMC processor). By explicitly specifying the pipeline stage register to be used as the source operand for a current instruction, the invention obviates the need to keep track of a large scoreboard addressing area. This, in turn, eliminates the need for any scoreboard structure in the design of the TMC processor. Elimination of such a data structure is significant because of the dense population of logic on the TMC processor. Moreover, the RRB operand allows i4' to be encoded with fewer instruction bits. That is, the novel RRB operand is preferably encoded using 4 bits as opposed to 12 bits needed for a displacement operand.

It should be noted that the term RRB is encoded in accordance with an assembler mnemonic wherein the first R denotes a register operand, and the subsequent RB denotes the result to be bypassed. Furthermore the term RRB denotes the current execution unit, whereas the term RIRB (i.e., inter-unit result bypass) denotes the alternate execution unit. It should also be noted that the data dependency referred to herein exists between a destination operand of a previous instruction and a source operand of a subsequent instruction.

In accordance with the present invention, a result in either the current (main) execution unit or the alternate (secondary) execution unit can be bypassed. That is, data can be bypassed from either the M-Unit or the S-Unit and be used as an input operand value to those units. The invention thus comprises, in part, an explicit result bypassing mechanism that obviates the use of scoreboarding structures for maintaining data dependencies with respect to addresses originating from memory. The performance realized in a pipeline procesor as the result of resolving data dependencies using the novel RRB operand is the same as that achieved by a pipeline processor having a scoreboarding structure to resolve such dependencies.

In another aspect of the invention, the register decode value comprises a source bypass (RISB) operand that allows source operand data to be shared among the parallel execution units (e.g., the M-Unit and S-Unit) of the pipelined TMC processor. For example, source bypassing allows the secondary S-Unit 650 to receive data stored at an effective memory address specified by a displacement operand in a previous instruction executed by the main M-Unit 640 of the TMC 600. The source bypassing mechanism involves sharing of the output of M-ISR1B 644 with the S-Unit by way of multiplexer 658. Assume packet data is fetched by the ID stage 630 over the read local bus 424 for processing by the M-Unit. Assume further that the following instructions are executed at the TMC:

(i5) M add RI←R2, 5(R3)
(i6) S and R2←RISB, R3

The M add instruction is executed by the M-Unit and directed to a particular byte (8 bits) within the data field specified by the memory operand 5(R3). This memory operand is decoded as a displacement operand and translated to an effective address that is driven over the local bus 425. The local bus transfers at least 32 bits of (non-aligned) data and, in this case, only 8 bits of that data will be operated upon by the instruction i5. Yet, the remaining 24 bits transferred over the local bus may be useful for subsequent instruction execution. It would thus be desirable to share that data among the multiple execution units. Source operand bypassing allows the S-Unit to receive data starting at the effective memory address specified by the displacement operand in the previous M add instruction i5. This is denoted by the i6 (S and) instruction and, in particular, the use of RISB source operand bypassing.

In accordance with the present invention, the source bypassing mechanism improves performance of the TMC processor 600, particularly for data received over the local bus 425 from a memory of the processing engine 300. That is, source bypassing allows realization of two memory references through the use of a single bus operation over the local bus. The RISB operand represents the data retrieved from the bus and is equivalent to the displacement operand address in the previous i5 (M add) instruction. In addition, the novel RISB decode value represents substantial coding efficiencies since it may be encoded with substantially fewer bits than those needed for a displacement address. For example, the RISB operand requires only 4 bits as opposed to the 12 bits necessary for the displacement address.

An advantage of the novel control mechanism is the increase in performance of a pipelined processor by enabling bypass operations without the use of dedicated hardware to identify and resolve operand dependencies. The inventive control mechanism further allows greater coding efficiency since memory operand results can be bypassed via a special register reference as opposed to specifying a memory operand. Moreover, pipeline stage register addressing provides an efficient means to specify the use of a previous instruction result as a source operand for the instruction.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A processor, comprising:
a first execution unit having a first and second input register coupled to first and second inputs to a first arithmetic logic unit (ALU), the first and second input registers of the first execution unit to store source operands, the first ALU capable of addressing a memory to retrieve a source operand;
a second execution unit having a first and second input register, the second register coupled to a second input to a second ALU, the first and second input registers of the second execution unit to store source operands, the second ALU not capable of addressing the memory; and
a multiplexer (MUX) having i) a first input coupled to the first input of the first ALU, ii) a second input coupled to the first input register of the second ALU, and iii) an output directly providing a first input to the second ALU, the MUX permitting both the first and second ALU to share the source operand retrieved by the first ALU from the memory.

2. The processor of claim 1, further comprising:
an instruction set defining a register decode value that specifies source operand bypassing, such that the MUX, in response to the register decode value that specifies source operand bypassing, selects the first input of the MUX coupled to the first input of the first ALU as the output of the MUX, the output of the MUX providing the first input to the second ALU.

3. The processor of claim 2, wherein the source operand bypassing value allows the second execution unit to receive data stored at an effective memory address specified by a displacement operand in the previous instruction executed by the first execution unit.

4. The processor of claim 1, further comprising:
a local bus for communicating with the memory;
a register file for storing intermediate operands; and
an instruction decode stage for coupling the register file to the first and second input registers of the first and second ALUs to provide intermediate operands as the source operands, and for coupling a memory bus to the first input register of the of the first ALU to provide source operands from the memory.

5. The processor of claim 4, wherein the first input register of the first ALU provides source operands from the memory to both the first input to the first ALU and to the first input of the MUX, thereby permitting the first input to the second ALU to share the source operands from the memory directly from the first input register of the first ALU.

6. The processor of claim 1, further comprising:
a pipeline of the processor, the pipeline having a plurality of stages including instruction decode, writeback, and execution stages, the execution stage having the first and second execution units.

7. The processor of claim 6, further comprising:
an instruction set defining a register decode value that defines result bypassing that allows bypassing of a result from a previous instruction executing in pipeline stages of the processor by directly addressing a result register of the first and second execution units.

8. The processor of claim 7, wherein the register decode value comprises:
one of a result bypass (RRB) operand and an inter-unit result bypass (RIRB) operand, each of which explicitly controls data flow within the pipeline of the processor.

9. The processor of claim 8, wherein the RRB operand denotes the first execution unit and the RIRB operand denotes the second execution unit.

10. The processor of claim 8, wherein the RRB operand explicitly infers feedback of the data delivered from the first execution unit to an input register of the first execution unit over a feedback path.

11. The processor of claim 10, wherein the writeback stage comprises an interstage register and wherein the RRB operand enables bypassing write-back of the data processed by the first and second execution units to one of the register file or the interstage register of the writeback stage.

12. The processor of claim 1, further comprising:
an instruction set defining a register decode value that defines source operand bypassing that allows source operand data to be shared among the first and second execution units by directly addressing a source register of the first execution unit.

13. The processor of claim 12, wherein the source operand bypassing value allows the second execution unit to receive data stored at an effective memory address specified by a displacement operand in the previous instruction executed by the first execution unit.

14. The processor of claim 1, further comprising:
a register file containing a plurality of general-purpose registers for storing intermediate result data processed by the first and second execution units.

15. The processor of claim 1, wherein the first and second execution units are parallel execution units.

16. The processor of claim 1, further comprising:
a current execution unit as the first execution unit; and
an alternate execution unit as the second execution unit.

17. The processor of claim 1, wherein the first and second ALU share the source operand stored in the first input register of the first ALU substantially simultaneously.

18. A method for use with a processor, the method comprising:
providing a multiplexer (MUX) having a first and second MUX input and a MUX output;
coupling the first MUX input to a first input of a first ALU, the first ALU capable of addressing a memory to retrieve a source operand from the memory;
coupling a second MUX input to a first input register of a second ALU, the second ALU not capable of addressing the memory; and
directly providing, by the MUX output, a first input to the second ALU, the MUX permitting both the first and second ALU to share the source operand retrieved from the memory by the first ALU.

19. The method of claim 18, further comprising:
defining a register decode value within an instruction set that specifies source operand bypassing, such that the MUX, in response to the register decode value that specifies source operand bypassing, selects the first MUX input coupled to the first input of the first ALU as the MUX output, the MUX output providing the first input to the second ALU.

20. The method of claim 19, wherein the source operand and bypassing value allows the second execution unit to receive data stored at an effective memory address specified by a displacement operand in the previous instruction executed by the first execution unit.

21. The method of claim 18, further comprising:
communicating with the memory;
storing intermediate operands in a register file; and
identifying an instruction decode stage for coupling the register file to the first and second input registers of the first and second ALUs to provide intermediate operands as source operands, and for coupling a memory bus to the first input register of the of the first ALU to provide source operands from the memory.

22. The method of claim 21, further comprising:
providing, by the first input register of the first ALU, source operands from the memory to both the first input to the first ALU and to the first MUX input, thereby permitting the first input to the second ALU to share the source operands from the memory directly from the first input register of the first ALU.

23. The method of claim 18, further comprising:
including a pipeline of the processor, the pipeline having a plurality of stages including instruction decode, writeback, and execution stages, the execution stage having a first and second execution unit, each having one of the first and second ALUs, respectively.

24. The method of claim 23, further comprising:
defining a register decode value that defines result bypassing of a result from a previous instruction executing in pipeline stages of the processor.

25. The method of claim 24, further comprising:
identifying a pipeline stage register for use as a source operand in an instruction containing the register decode value by directly addressing a result register.

26. The method of claim 25, further comprising:
explicitly controlling data flow within the pipeline stages of the processor through the use of a register result bypass (RRB) operand in the register decode value.

27. The method of claim 26, wherein the step of explicitly controlling comprises:
retrieving data from the first execution unit; and
returning the data to an input of the first and second execution units as specified by the RRB operand, thereby bypassing write-back of the data to either a register file or memory at the writeback stage.

28. The method of claim 27, wherein the step of identifying further comprises:
explicitly specifying the pipeline stage register to be used as the source operand for the instruction.

29. The method of claim 28, further comprising:
encoding the RRB operand in fewer bits than a regular register operand.

30. The method of claim 23, further comprising:
defining a register decode value that defines source oper- and bypassing of source operand data.

31. The method of claim 30, further comprising:
identifying a pipeline stage register for use as a source operand in an instruction containing the register decode value by directly addressing a source register.

32. The method of claim 31, further comprising:
sharing source operand data among the first and second execution units of the pipelined processor through the use of a source bypass (RISB) operand in the register decode value.

33. The method of claim 32, wherein the step of sharing further comprises:
receiving data at the second execution unit, the data stored at a memory address specified by a displacement oper- and in a previous instruction executed by the first execution unit of the processor.

34. The method of claim 33, wherein the step of sharing further comprises:
realizing two memory references through the use of a single bus operation over a local bus.

35. The method of claim 34, wherein the step of sharing further comprises:
encoding the RISB operand with substantially fewer bits than those needed for a displacement address.

36. The method of claim 18, further comprising:
sharing a source operand stored in a first input register of the first ALU at the first and second ALU substantially simultaneously.

37. An apparatus, comprising:
a multiplexer (MUX) having a first and second MUX input and a MUX output;
means for coupling the first MUX input to a first input for a first ALU, the first ALU capable of addressing a memory to retrieve a source operand from the memory;
means for coupling a second MUX input to a first input register for a second ALU, the second ALU not capable of addressing the memory; and
means for directly providing a first input to the second ALU, the means for directly providing permitting both the first and second ALU to share the source operand retrieved from the memory by the first ALU.

38. The apparatus of claim 37, further comprising:
means for defining a register decode value within an instruction set that specifies source operand bypassing, such that the MUX, in response to the register decode value that specifies source operand bypassing, selects the first MUX input coupled to the first input of the first ALU as the MUX output, the MUX output providing the first input to the second ALU.

39. The apparatus of claim 38, wherein the source operand bypassing value allows the second execution unit to receive data stored at an effective memory address specified by a displacement operand in the previous instruction executed by the first execution unit.

40. The apparatus of claim 37, further comprising:
means for communicating with the memory;
means for storing intermediate operands; and
means for identifying an instruction decode stage for coupling the register file to the first and second input registers of the first and second ALUs to provide intermediate operands as source operands, and for coupling a memory bus to the first input register of the of the first ALU to provide source operands from the memory.

41. The apparatus of claim 40, further comprising:
means for providing source operands from the memory to both the first input to the first ALU and to the first MUX input, thereby permitting the first input to the second ALU to share the source operands from the memory directly from the first input register of the first ALU.

42. The apparatus of claim 37, further comprising:
means for sharing a source operand stored in a first input register of the first ALU at the first and second ALU substantially simultaneously.

43. A processor, comprising:
a first ALU, the first ALU capable of addressing a memory to retrieve a source operand from the memory;
a second ALU, the second ALU not capable of addressing the memory; and
a circuit to couple a first input of the first ALU to a first input of the second ALU to provide an operand retrieved from the memory by the first ALU as an input to the second ALU.

44. The processor of claim 43, wherein the circuit further comprises:
a multiplexer, the multiplexer having an input connected to the first input of the first ALU and an output connected to the first input of the second ALU.

45. A processor, comprising:
a first ALU, the first ALU capable of addressing a memory to retrieve an operand
a second ALU, the second ALU not capable of addressing the memory;
a first circuit capable of providing an operand retrieved by the first ALU from a memory as an input to the second ALU;
a second circuit capable of providing a result from either the first ALU or the second ALU as an input to the second ALU; and
an instruction set having a register decode value which is capable of selecting as an input to the second ALU either the operand or the result.

46. The processor of claim 45, wherein the circuit further comprises:
a multiplexer, the multiplexer having a first input connected to the first input of the first ALU, a second input coupled to the result, and an output connected to the input of the second ALU, the multiplexer selecting whether the second ALU receives the operand or the result as an input.

47. The processor of claim 45, further comprising:
a circuit providing the result to both the first ALU and the second ALU.

48. A method for operating a processor, comprising:
addressing a memory by a first ALU to retrieve a source operand from the memory;
providing a second ALU, the second ALU not capable of addressing the memory; and
coupling a first input of the first ALU to a first input of the second ALU to provide an operand retrieved from the memory by the first ALU as an input to the second ALU.

49. The method of claim 48, further comprising:
connecting an input of a multiplexer to the first input of the first ALU; and
connecting an output of the multiplexer to the first input of the second ALU.

50. A method for operating a processor, comprising:
providing an operand retrieved by a first ALU from a memory as an input to a second ALU, the second ALU not capable of addressing the memory;
providing a result from either the first ALU or the second ALU as an input to the second ALU; and
selecting, by an instruction set having a register decode value, either the operand or the result as an input to the second ALU.

51. The method of claim 50, further comprising:
connecting a first input of a multiplexer to the first input of the first ALU;
connecting a second input of the multiplexer to the result; and
connecting an output of the multiplexer to the input of the second ALU, the multiplexer selecting whether the second ALU receives the operand or the result as an input.

52. The method of claim 50, further comprising:
providing the result to both the first ALU and the second ALU.

* * * * *